No. 611,079. Patented Sept. 20, 1898.
H. E. PRIDMORE.
MACHINE FOR HARVESTING GRAIN.
(Application filed July 3, 1895. Renewed Apr. 25, 1898.)
(No Model.) 8 Sheets—Sheet 2.
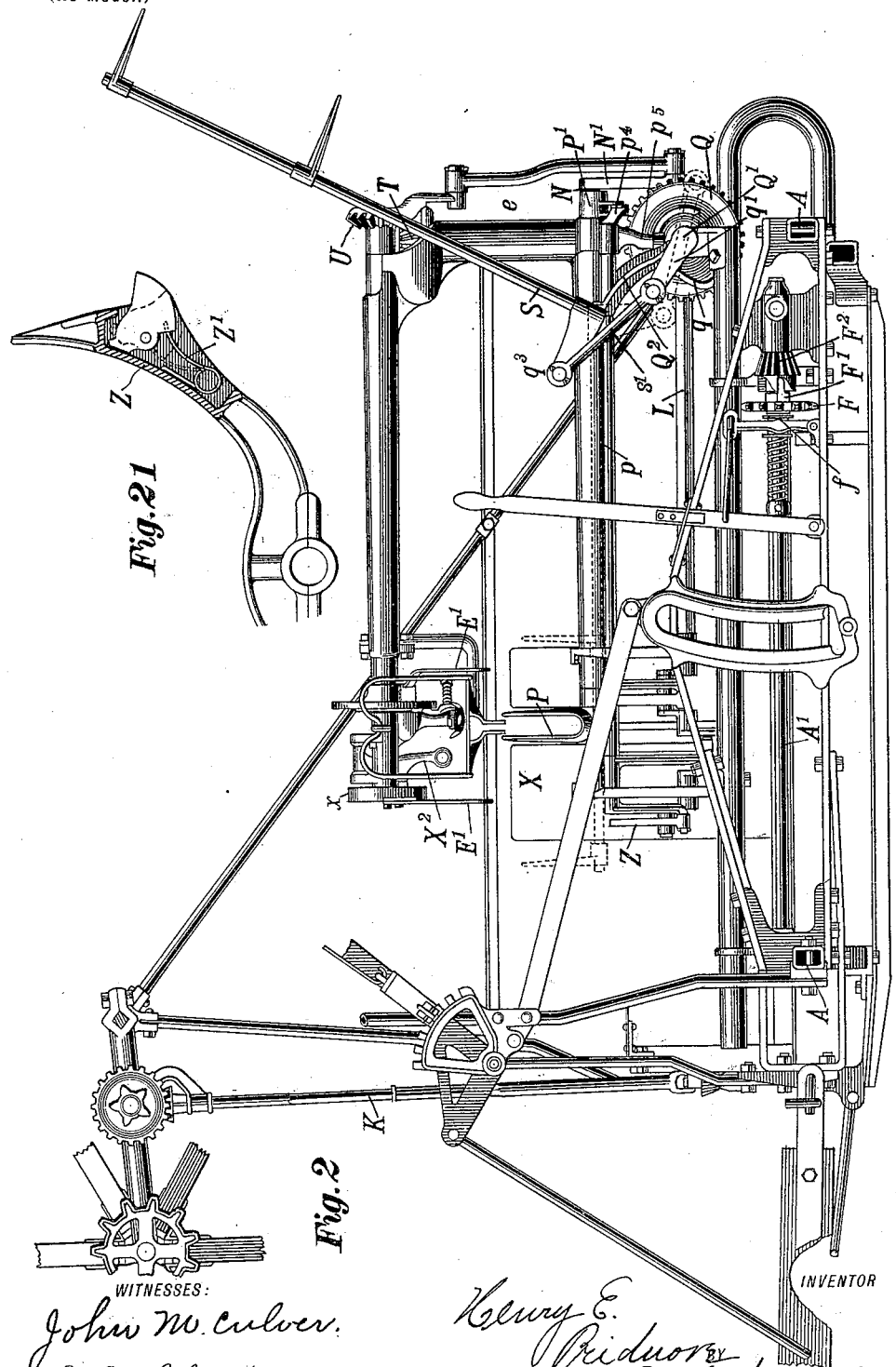

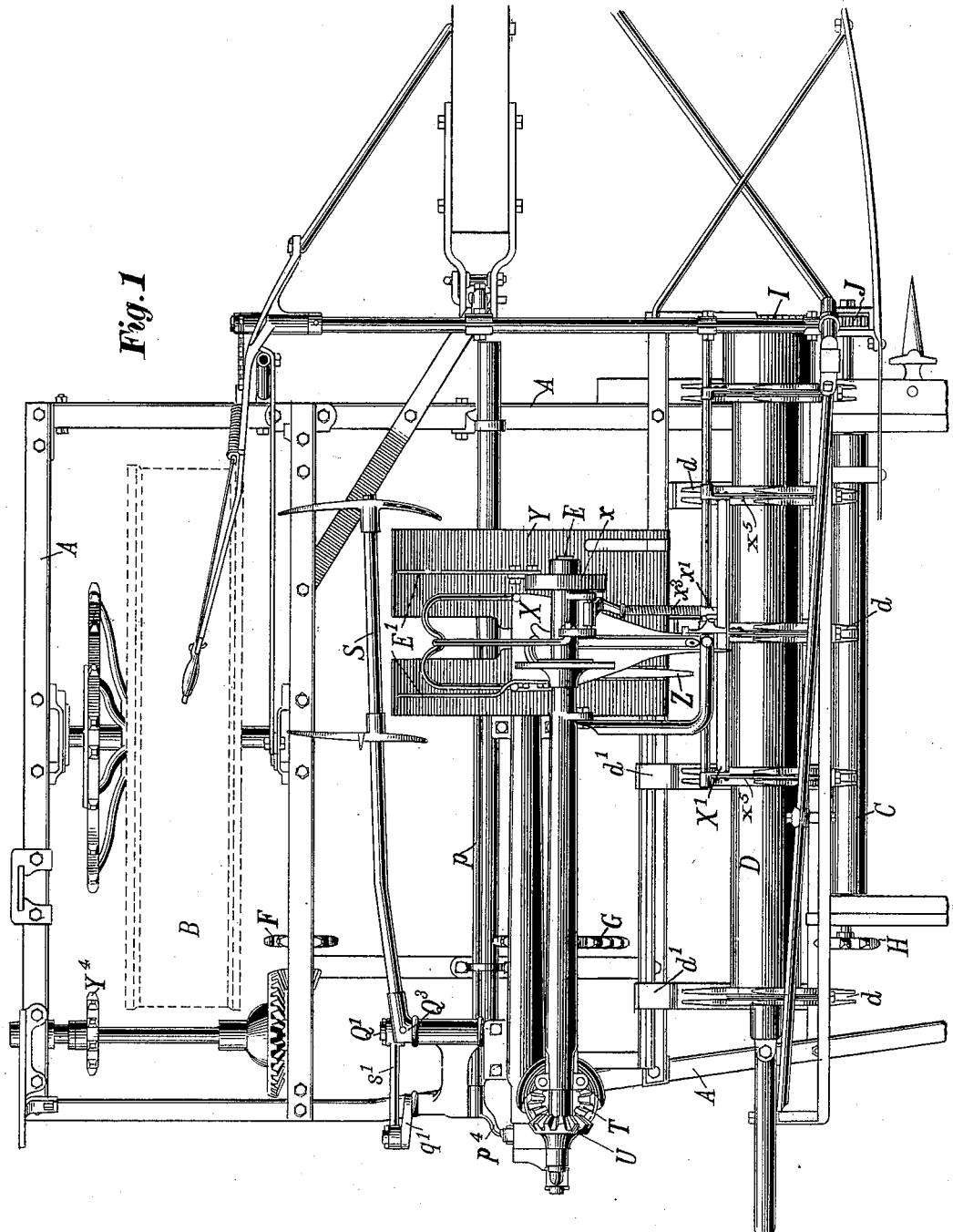

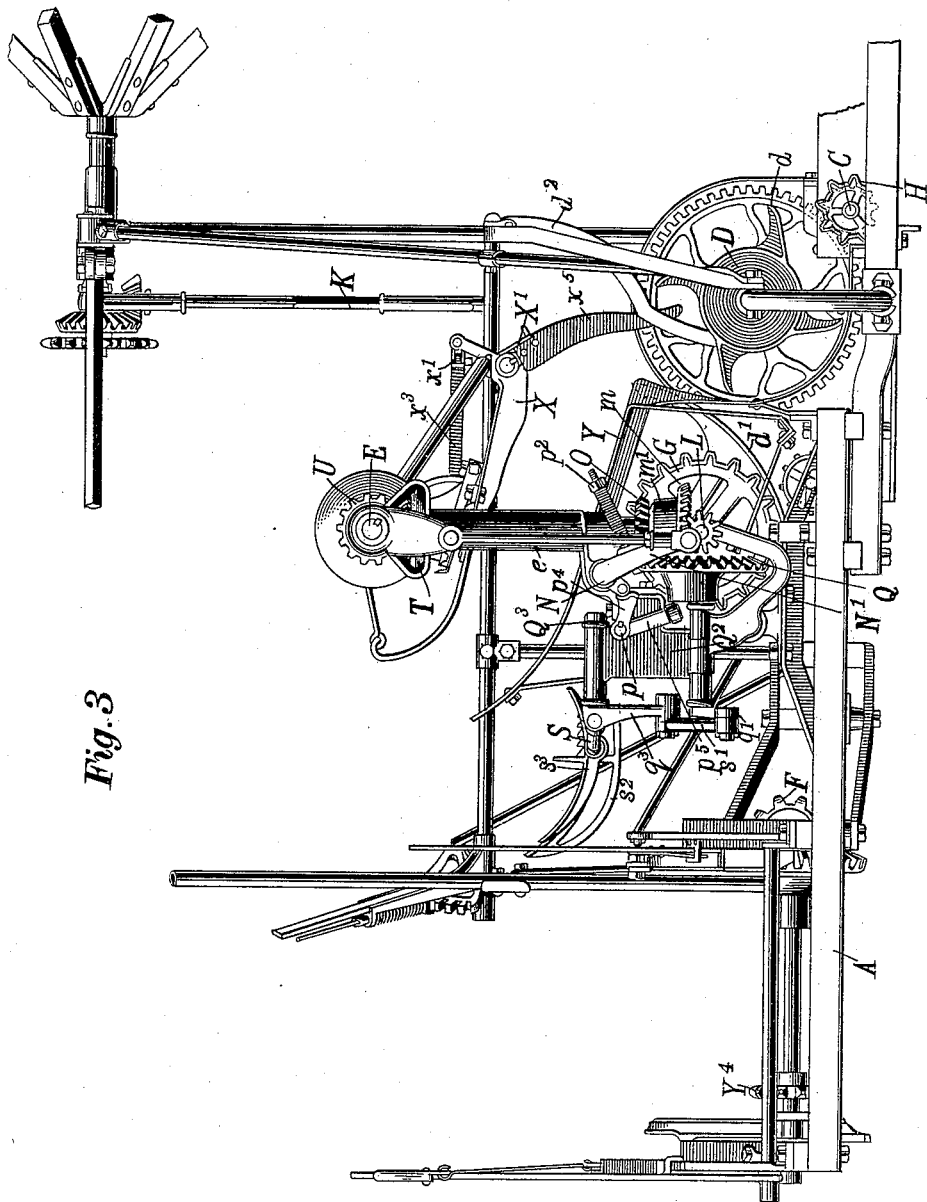

No. 611,079. Patented Sept. 20, 1898.
H. E. PRIDMORE.
MACHINE FOR HARVESTING GRAIN.
(Application filed July 3, 1895. Renewed Apr. 25, 1898.)
(No Model.) 8 Sheets—Sheet 4.
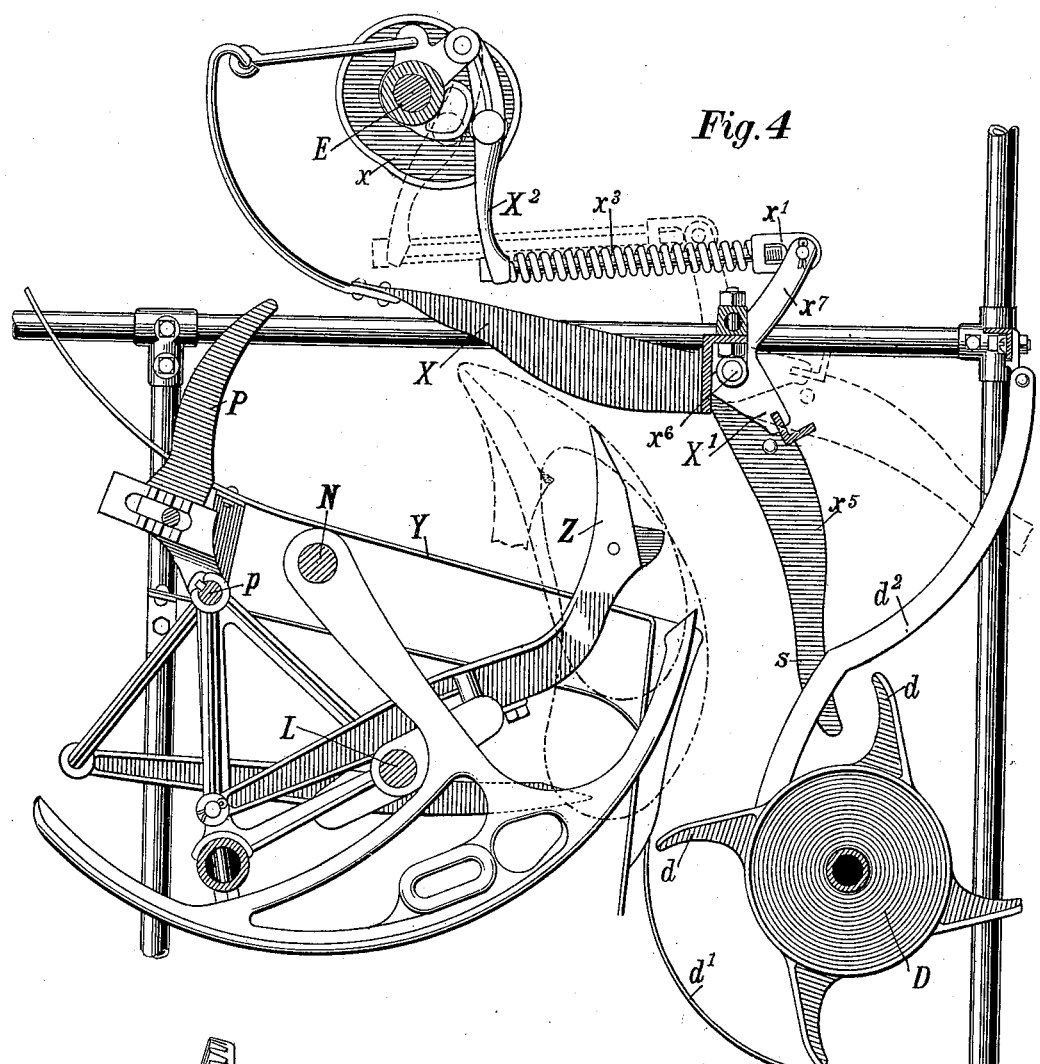
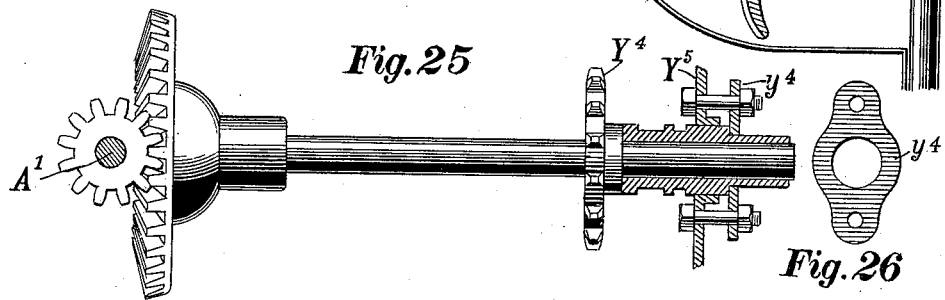

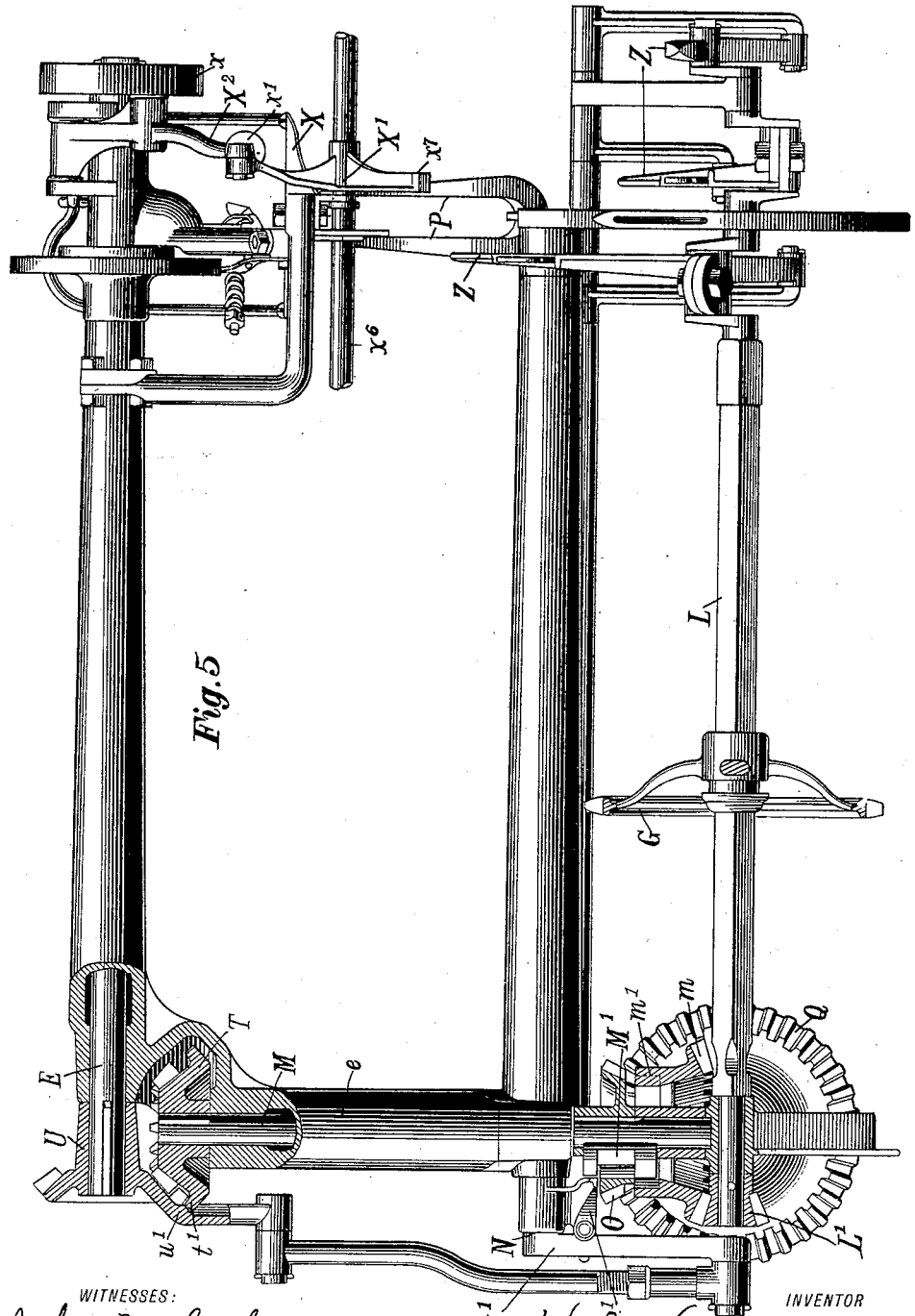

No. 611,079. Patented Sept. 20, 1898.
H. E. PRIDMORE.
MACHINE FOR HARVESTING GRAIN.
(Application filed July 3, 1895. Renewed Apr. 25, 1898.)
(No Model.) 8 Sheets—Sheet 6.
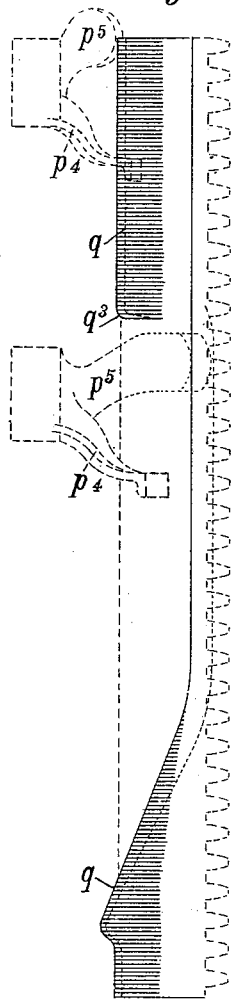
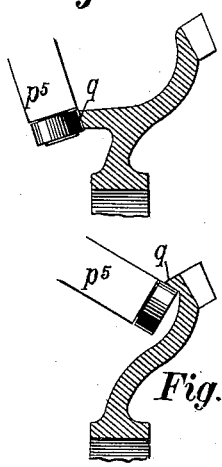
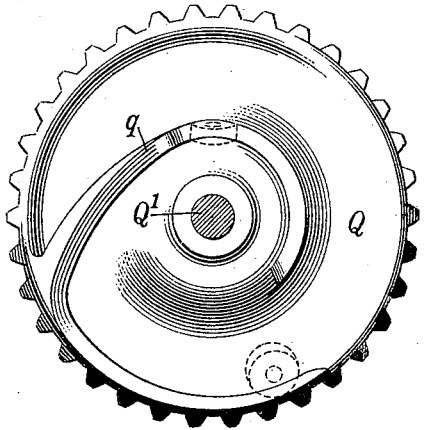
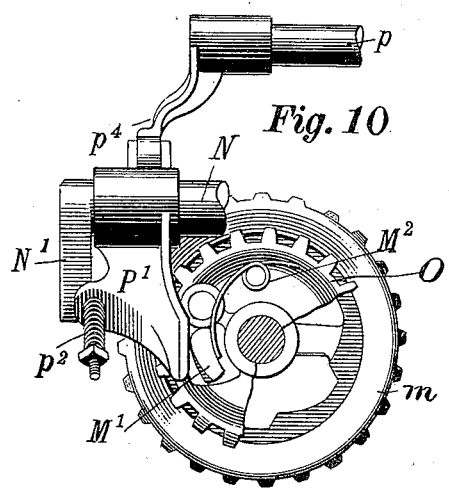
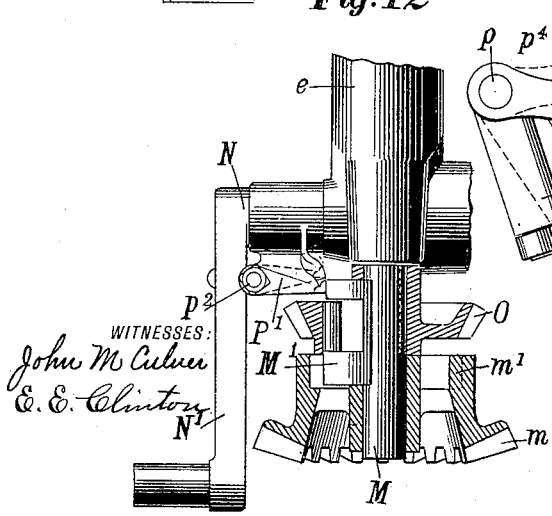
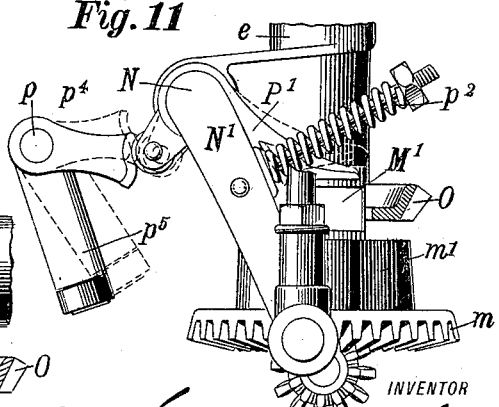
WITNESSES:
John M Culver
E. E. Clinton
INVENTOR
Henry E. Pridmore
BY
R. B. Swift
ATTORNEY.
THE NORRIS PETERS CO., PHOTO-LITHO., WASHINGTON, D. C.

No. 611,079. Patented Sept. 20, 1898.
H. E. PRIDMORE.
MACHINE FOR HARVESTING GRAIN.
(Application filed July 3, 1895. Renewed Apr. 25, 1898.)

(No Model.) 8 Sheets—Sheet 7.

WITNESSES:
John M. Culver
E. E. Clinton

INVENTOR
Henry E. Pridmore
BY R. B. Swift
ATTORNEY.

No. 611,079. Patented Sept. 20, 1898.
H. E. PRIDMORE.
MACHINE FOR HARVESTING GRAIN.
(Application filed July 3, 1895. Renewed Apr. 25, 1898.)
(No Model.) 8 Sheets—Sheet 8.
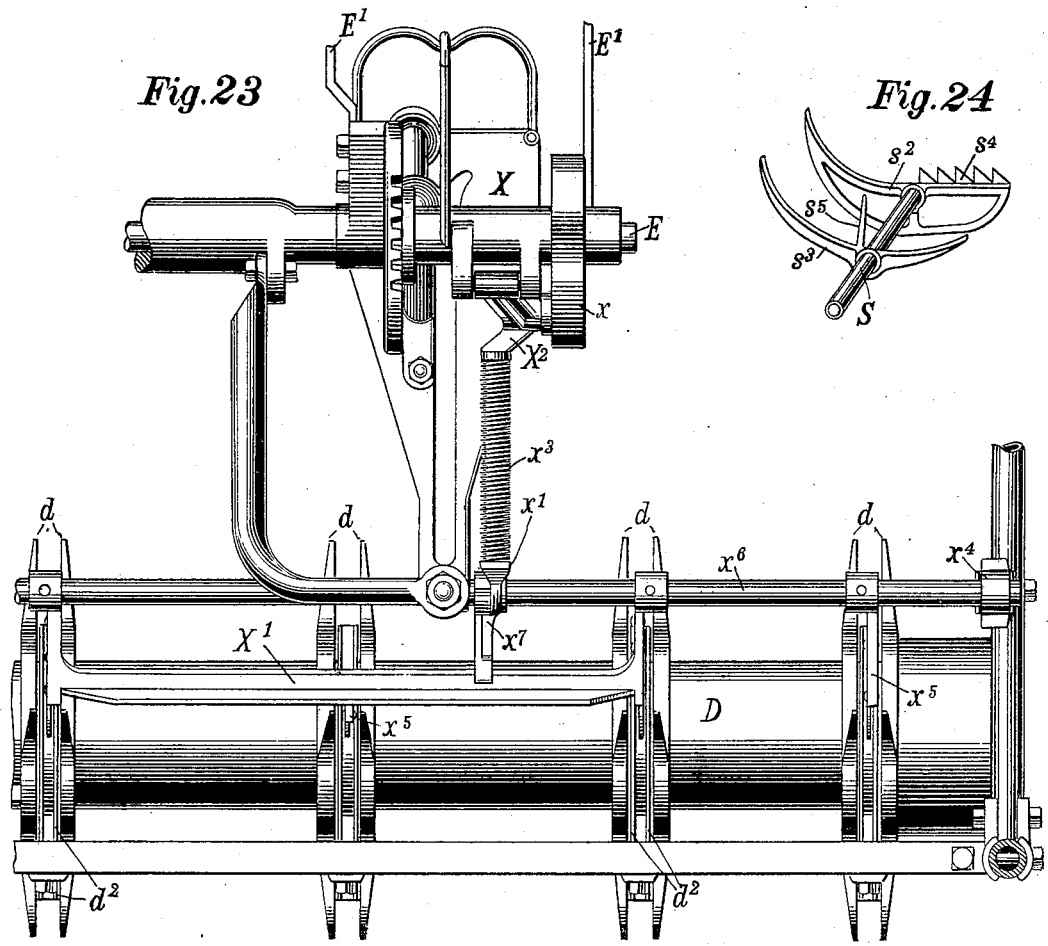
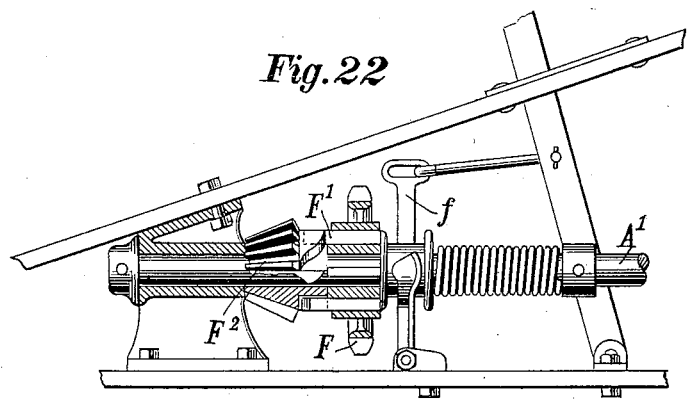
WITNESSES: INVENTOR
John M. Culver. Henry E. Pridmore
E. E. Clinton. BY R. B. Swift.
ATTORNEY.

United States Patent Office.

HENRY E. PRIDMORE, OF CHICAGO, ILLINOIS, ASSIGNOR TO THE McCORMICK HARVESTING MACHINE COMPANY, OF SAME PLACE.

MACHINE FOR HARVESTING GRAIN.

SPECIFICATION forming part of Letters Patent No. 611,079, dated September 20, 1898.

Application filed July 3, 1895. Renewed April 25, 1898. Serial No. 678,812. (No model.)

*To all whom it may concern:*

Be it known that I, HENRY E. PRIDMORE, a citizen of the United States, residing at Chicago, in the county of Cook and State of Illinois, have invented certain new and useful Improvements in Machines for Harvesting Grain, of which the following is a specification.

My improvement relates to machines of the low-down type, in which the grain is taken from the platform by forwarding devices and brought within the sweep of the packers, which force it into a binder that is positioned between the main driving-wheel of the machine and the platform, and when bound it is ejected therefrom onto an oscillating fork that discharges the bundle to the rear of the machine upon its butts.

The invention consists in the means employed to conduct the grain into the binder, in the position and construction of the binder, and in the operation, location, and action of the oscillating discharge-fork that throws the bundle from the machine.

There are certain novel details in construction that will also be pointed out.

Figure 13:
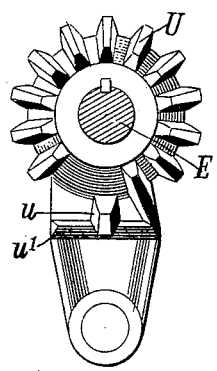
Figure 14:
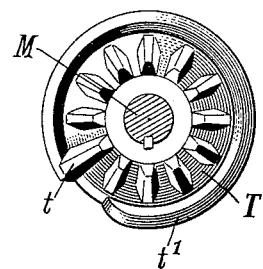
Figure 15:
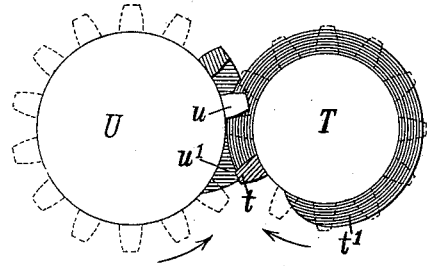
Figure 18:
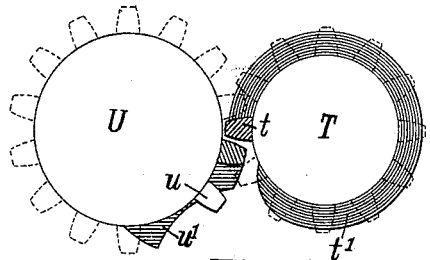
Figure 16:
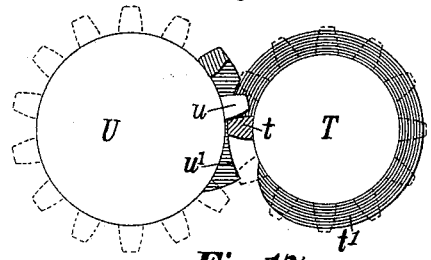
Figure 19:
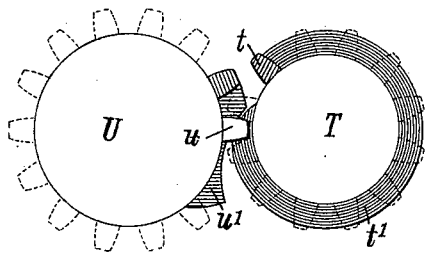
Figure 17:
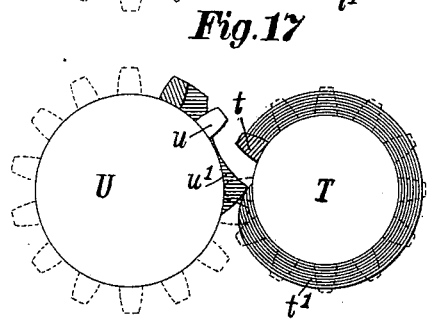
Figure 20:
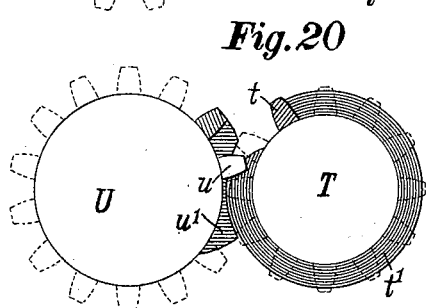

Figure 1 is a plan view of so much of the machine as is necessary to show the features embracing my invention. Fig. 2 is a side view in elevation from the main-wheel side of the machine, taken from a point upon the grain side of the main wheel. Fig. 3 is a rear elevation of the machine with the main wheel and platform removed. Fig. 4 is an enlarged end view of the devices that forward the grain into the binder, together with the grain passage-way as it is defined while the bundle is in process of formation, taken from a plane passed vertically through the forwarding devices just in rear of the needle. Fig. 5 is an elevation, partly in section, of the binding attachment removed from the machine. Fig. 6 is an enlarged view of the cam-track and cam-wheel that controls the trip and compressor-arm during the formation of a bundle. Fig. 7 is a diagrammatic view of the cam-wheel shown in Fig. 6, with the trip-shaft arm shown in dotted lines. Figs. 8 and 9 are sections of the cam-wheel shown in Fig. 6, with the arm upon the trip-shaft on the cams. Fig. 10 is a top view, partly in section, of the clutching mechanism, showing the trip-stop and the arm upon the trip-shaft. Fig. 11 is an end view in elevation of the same parts. Fig. 12 is a side view of the parts shown in Fig. 11, the bevel-wheel being in section. Fig. 13 is a view of the bevel-wheel upon the knotter-shaft. Fig. 14 is a view of its companion wheel that is located on the upright shaft of the binder. Figs. 15, 16, 17, 18, 19, and 20 are diagrammatic views of the bevel-wheels shown in Figs. 13 and 14 in the positions that they occupy during certain intervals in the formation and tying of a bundle. Fig. 21 is a view of the grain end of one of the packers detached from the machine, with one side partly broken away to show the method of pivoting the fluke and of attaching the spring so that the fluke is normally held into the path of the grain. Fig. 22 is a longitudinal vertical section through the main clutching mechanism. Fig. 23 is a top view of the gate, showing its method of attachment to the machine and breastplate, also showing the brace-arm that is bolted to the upper member of the binder-frame and forms a support for the receiving end of the breastplate. Fig. 24 is an end view of the discharge-fork, showing the form of the tines. Fig. 25 is a view of the main cross-shaft of the machine, partly in section, showing a means for keeping the main bevel-wheel in mesh with its pinion, while Fig. 26 is an end view of the collar to adjust the bevel-pinion.

Similar letters refer to similar parts throughout the several views.

The main frame of the machine is formed of square pipe and is lettered A. The main wheel B supports and gives motion to the operative parts of the machine at one end of the frame, while the usual small wheel at the grain side carries the divider end. The platform and divider have been broken away in most of the views so that the other parts could be more clearly shown and because the construction of these parts is common and no part of my invention. The grain after being severed is reeled upon the platform, whereon is an apron of the usual form, traveling around rollers, the inner roller C of which is shown in the drawings, and is transported to a feeding device or forwarding device consisting of the drum D, armed with feed-teeth $d$, which gather the grain and carry it with them in their rotation, the grain being held upon them by the straps $d'$, that extend from the platform-roller to the binder and which form one side of the grain passage-way. Clearer-bars $d^2$ extend from the feed-drum to a fixed part of the machine above the feed-drum and serve to wipe the grain off from the feed-teeth $d$ as the feed-drum continues its rotation.

Positioned on the machine between the feed-drum and the main wheel is the binder. In its general form it resembles the ordinary type of the so-called "Appleby binder." The deck Y, on which the bundle is accumulated, is slightly above the top of the feed-teeth $d$ on the feed-drum D, and the packers Z in their sweep enter the grain passage-way to assist the feed-teeth upon the feed-drum in the forcing of the grain forward. A novel construction of these packers Z that allows the binder to be placed so closely to the feed-drum D will be hereinafter described.

Motion is transmitted from the crank or main shaft $A'$ of the machine by a chain that extends across the sprocket-wheel F on the crank-shaft $A'$, the sprocket-wheel G on the packer-shaft L of the binder, and the sprocket-wheel H on the inner roller C of the harvester-platform. On the forward end of the feed-drum D is the spur-wheel I, which meshes with the spur-wheel J on the inner platform-roller C, and motion is given to the feed-drum, which in turn transmits motion to the reel through the telescoping shaft K.

While the binding attachment as a whole is of the ordinary form of binders of the Appleby type, it is changed from this type in the method of giving motion to the knotter and ejector shaft E, in the clutching and unclutching devices, and in other particulars, as I will now proceed to point out.

The sprocket-wheel G is on the packer-shaft L and transmits motion thereto. Upon the end of the shaft L toward the upright member of the ⌐-shaped binder-frame is positioned the bevel-pinion $L'$. Journaled in the upright $e$ of the binder-frame is the shaft M. It is plain that this shaft could be journaled in bearings attached to the frame; but I have found that it makes a more simple-looking structure to journal it in the frame itself. On the lower end of this shaft is the loosely-mounted bevel-wheel $m$, an extended upper flange of which, $m'$, is corrugated or notched, so that the ratchet $M'$, that is pivoted in the bevel-wheel O, which is keyed fast to the shaft, will when it is pressed outwardly by the spring $M^2$ enter the notches on the bevel-wheel $m$ and motion be thus transmitted from the packer-shaft L to the upright shaft $e$. As thus far described, with the ratchet in engagement with the notches in the bevel-wheels, the binder would run continuously, providing suitable connections join the upright shaft M with the knotter-shaft E. This, however, is not desirable, as it is necessary in cord-binding machines to make bundles of a uniform size, and therefore a trip-finger P is positioned in the path of the stream of grain and mounted on a shaft $p$, that is continued along the lower member of the ⌐-shaped binder-frame and at its outer end carries a forked arm. Sleeved upon the needle-shaft N is a trip-stop $P'$, that is held in normal position by the spring $p^2$, that is pivoted to the crank on the needle-shaft. A tail extension from the trip-stop is extended into the path of one fork $p^4$ of the arm. Pressure applied to the trip-fingers P will thus be transmitted and act upon the trip-stop $P'$, which will be raised against the stress of the trip-stop spring $p^2$, and the trip-stop will be lifted out of the path of the ratchet $M'$, which will be thrown into engagement with the ratchets on the flange of the bevel-wheel $m'$ and the binder begin operation. The needle-crank $N'$ will carry the trip-stop $P'$ with it in its vibration and will return it into the path of the ratchet $M'$, unclutching it when it has completed a vibration. The trip-finger P, however, performs the office of compression—that is, it stays in the path of the stream of grain while the needle is advancing and forcing a bite of grain against it and gets out of the way after the knot is tied. This operation is performed by the arm $p^5$ on the trip-shaft being brought into the path of a cam-track $q$ on the bevel-wheel Q, that is mounted on a counter-shaft $Q'$ and keyed thereto, which counter-shaft has its bearing in an extension $Q^2$ of the binder-frame. Figs. 6, 7, 8, and 9 show the arm $p^5$ from the trip-shaft as it comes into the path of the cam $q$ and how the trip-finger P is held into the path of the stream of grain during the interval when the binding operation is taking place and when the ejector-arms $E'$ are forcing the bundles from the binder; also, how the cam-track is cut away to allow the trip-finger $p$ to swing backwardly and allow the bundle to pass over it as it is ejected by the ejector $E'$. The bundle, being swept out of the binder by the ejector-arms $E'$, (shown more clearly in Figs. 1 and 2,) would drop between the binder and the main wheel and there rest were it not that it is thrown upon a pivoted oscillating fork S, that discharges it to the rear.

In machines having oscillating forks discharging to the rear it has been found necessary to turn or rock the shaft of the fork, so that the fork-tines would pass beneath the bundle. In my invention I do away with this turning or rolling of the fork by so timing the fork in relation to the operation of binding and discharging the bundles that it shall at the time the bundle is discharged bound be beneath the bundle. The fork therefore needs only an oscillatory motion on its axis.

I am aware that endeavors have been made to combine with a hand binding attachment an oscillating discharge-fork and to actuate the fork in reference to the action of the attachment, so that the complex system of cams and levers necessary to roll the fork can be dispensed with. So far as I am aware, however, there has been no machine made that has been capable of practical operation unless the vibratory motion of the fork has been combined with a rolling motion to get the tines beneath the bundle. I accomplish this object in the following manner: The fork is mounted on a transverse shaft $Q^3$, pivoted in the extension to the binder-frame $Q^2$ in such a position as to be horizontal when beneath the bundle, and an arm $q^3$ from the fork is connected by means of the pitman $s'$ with a crank $q'$ on the counter-shaft $Q'$. The rotation of the counter-shaft $Q'$ will therefore, the lengths of the cranks being in such proportion that the rotary one is shorter than the arm on the discharge-fork, vibrate the fork back and forth from a position nearly vertical to a horizontal one beneath the place where the bundle is to be discharged by the rotary discharge-arm $E'$ of the binder.

As thus far explained the discharge-fork and the binding attachment would when in operation act together. It is, however, necessary that the discharge-fork should have a movement sufficient to throw the bundle to the rear after the tying and ejecting mechanism have come to rest. This I accomplish by mounting a peculiarly-constructed bevel-pinion T on the upper end of the upright shaft M, and on the knotter-shaft E, which is journaled in the upper horizontal member of the main frame, a companion bevel-pinion U is positioned. Fig. 13 shows the bevel-pinion U, and Fig. 14 the bevel-pinion T. Figs. 15, 16, 17, 18, 19, and 20 show diagrammatically positions that will be occupied by the bevel-wheels during the formation of and the tying and ejecting of a bundle upon the discharge-fork. At the beginning of the tying operation the bevel-pinions occupy a position with relation to each other shown in Fig. 15. The driving-pinion T is started when its long tooth $t$ engages with the short projecting tooth $u$ on the bevel-pinion U. The knotter-shaft is thus rotated until the delay-flange $t'$ is brought around on the delay-flange $u'$ and the broken space in the flange $t'$ strikes the curved end of the flange $u'$, thus throwing the pinions so that their teeth intermesh and they rotate, following the diagram as shown in the diagrammatic figures of these pinions. It will be noticed that the bevel-pinion U has one more tooth than the bevel-pinion T and that the end of the first revolution of these pinions will leave them in the position shown in Fig. 20—that is, with the teeth out of mesh and the delay-flanges together. At this interval the needle has made its reciprocation with the cord to compress the bundle and to present the cord for the tying of it and has dropped back to its normal position. The trip-stop P', following this movement, has returned with it, but does not unclutch the binder, because the branch $p^5$ of the forked arm on the trip-shaft, traveling over the cam $q$, holds the other branch $p^4$ in such position against the trip-stop P' that it cannot descend into the path of the ratchet M'. The upright shaft M therefore still continues its movement, the bevel-pinion T being revolved; but the pinion U is not rotated, inasmuch as the delay-flanges $t'$ and $u'$ upon these pinions are together and the blank space in the pinion U opposite the teeth of the pinion T. When this rotation has continued until the bevel-pinions are in the position shown in Fig. 15—that is, when the pinion T has made two revolutions and its projecting long tooth $t$ is approaching the short projecting tooth on the bevel-pinion U—the cam-track $q$ on the bevel-wheel $Q^2$ is deflected, as shown at $q^8$ in Fig. 7, so that the fork $p^5$ drops away from the trip-stop P' and the trip-stop spring $p^2$ brings it into the path of the ratchet M' and the device is unclutched. The last partial revolution of the upright shaft M is therefore of no effect on the knotter-shaft E and needle-shaft N. It, however, is effective upon the bevel-wheel Q and its shaft and crank and the discharge-fork S, which has been thrown beneath the bundle by the first movement of the binder and is now carried on its return movement and the bundle discharged to the rear. The machine, as explained, is then unclutched and all the parts cease operation.

The deck Y is continued toward the discharge side of the binder beyond the trip and compressor finger P and is curved upwardly, conforming substantially in its direction to the breastplate X and its extension. The binder-deck Y is, as shown in Fig. 1, of a width only sufficient to hold the accumulating grain, the frame of the binder to the rear and the machine to the front being left uncovered. This width of the binder-deck Y is narrower than the projecting tines upon the discharge-fork S. The fork therefore when it makes its reciprocation passes beneath the outer end of the binder-deck Y, and the bundle discharged by the discharge-arms is carried along the deck, because the curvature of the deck corresponds with that of the breastplate and the sweep of the discharge-arms, and a wide separation of the bound from the unbound grain by the discharge-arms thus ensues. The bundle is then caught by the upward sweep of the discharge-fork and thrown to the rear of the machine.

The tines or receiving-arms $s^2 s^3$ of the discharge-fork S are formed in a peculiar manner for the following purpose: The front rib $s^2$ is notched, as shown at $s^4$ in Fig. 24, to prevent the bundle that is thrown upon it from slipping therefrom. In practice I have found that even though the ejector-arms E' of the binder make a long separation still in badly-tangled grain the butts will hang together, and these notches upon the tine, the long bevel of which is toward the receiving side, so that the bundle will slip on, prevent the bundle from slipping off when the discharge-fork S starts its oscillation. The tangled butts are thus torn apart. The rear tine $s^3$ is formed with an upwardly-projecting finger $s^5$, that strikes into the bundle, and when the fork is raised toward a vertical position this finger prevents the bundle from sliding down upon its head before the discharge-fork has reached a position where the bundle will be turned over and discharged to the rear upon its butts.

As heretofore explained, the packers Z are given motion from the packer-shaft L, which is in continuous operation, and the binder is so positioned in relation to the feeding device B that it projects somewhat into the path of the stream of grain and the packers Z enter the stream to aid in lifting and forcing it onward to the binder. So long as the grain passage-way is open and there is room for the grain in the bundle that is being formed in the binder the packers are of great assistance in getting hold of the grain and moving it onwardly. When, however, the needle has advanced to encircle the gavel and the passage-way to the binder has been cut off, the grain will accumulate behind the needle and the packers, positively driven as they are, will soon clog the machine. I have remedied this and am enabled to keep the packer into the stream of grain by pivoting the packer-fluke $z$ to the packer and holding it forward into aggressive position by means of the spring $z'$, as shown in Fig. 21. The packer thus takes enough hold of the grain when the passage-way is open to feed it forward, and the fluke $z$ will let go by sliding back when the passage-way is closed and the grain somewhat compacted in the receptacle.

The grain passage-way from the platform to the binder is formed on one side by the curved straps $d'$, that hold the grain upon the teeth of the feed-drum D and which extends from the platform-roller to the binder. On the other side scrolls or clearer-bars $d^2$ are extended from the feed-drum and fastened to a stationary part of the machine above and inward of the feed-drum. Each of these scrolls is slotted or made double for a purpose hereinafter to be explained. The breastplate X, that is attached to the binder-frame, extends parallel, or practically so, with the deck Y, and its inner end is in a vertical plane that passes through the point of the needle, or nearly so. To form the passage-way between the scrolls $d^2$ and the breastplate X, I pivot a gate $X'$ to the breastplate at one end and at the other to the frame of the machine and connect it with a lever $X^2$, pivoted on the binder-frame, which lever is acted upon by a cam $x$, that is rotated by the knotter-shaft E. A link $x'$ connects the gate with the cam-lever $x^2$ and opens it at the time that the needle shuts off the flow of the stream of grain into the binder. A receptacle is thus formed in the curved scrolls $d^2$ for the accumulation of the grain. When the bundle has been ejected and the needle retreats, the cam-arm $x^2$ forces the gate into its normal position, so that the grain is directed to the binder. Should a large mass of grain be accumulated in the receptacle during the binding operation and the gate be forced back rigidly, the binder could not take care of it at once and the parts would be clogged. I have therefore mounted on the link $x'$ a spring $x^3$, upon which the lever $x^2$ acts, thus giving the gate a spring-pressure and relieving the binder when a large wad of grain has accumulated.

The gate that acts to direct the stream of grain into the binder and opens, as has been described, to form a receptacle for the accumulation of the grain, while the entrance to the binder has been cut off during the binding operation, is constructed by keying the fingers $x^5$ to a shaft or gate-bar $x^6$, the front end of which is loosely mounted in a bearing $x^4$ on the framework of the machine and pinned to prevent its sliding backward and forward when the binder is adjusted. The receiving ends of the fingers $x^5$ are placed in the slots in the clearer-bars $d^2$. The other end of the gate-bar $x^6$ slides freely through a bearing in the breastplate X. An arm $x^7$ is splined to the gate, so that the gate-bar can freely slide through it when the binder is adjusted, and this arm is acted upon by the link $x'$, thus operating the gate in the manner heretofore set forth.

As heretofore explained, the binder and the roller for the platform-apron, from the forward end of which motion is transmitted to the feed-drum D and reel, are actuated by a single chain that receives motion from the sprocket-wheel F on the main or crank shaft of the machine. That these parts may be driven by one chain in this manner necessitates that the sprocket-wheel F be positioned as far to the rear on the crank-shaft as is possible, so that the platform-apron can have sufficient width to carry the grain to the feed-drum. I have made a new and economical construction of these parts and one that allows them to be put into small compass by sleeving a double-pronged clutch F' on the main shaft, the prongs of which slide through openings in the sprocket-wheel F, which is keyed fast to the main or crank shaft of the machine, and engage with the notches formed in the hub of the bevel-pinion $F^2$, which is loosely mounted upon the shaft. The lever $f$ is pivoted upon the frame of the machine and passes between flanges on the double-armed clutch F'. A link connects this lever with a shipping-lever that is in convenient reach of the driver.

It has been found in harvesting-machines that the bevel-wheel tends to work away from the bevel-pinion, especially where the work to be done is as heavy as it is on the main counter-shaft and the crank-shaft. In order to compensate for this spreading and wear, I mount the box for one end of the counter-shaft in a bearing upon the machine so that it can be slid and key to the shaft a collar or other fixed element, as the sprocket-wheel Y⁴, against which the box abuts. A collar $y^4$ is set over the box and against a shoulder thereon. Bolts connect this washer with a fixed part of the machine, as Y⁵. As these bolts are shortened the bevel-wheel is thrown toward the bevel parts and the gearing kept in mesh.

The machine has been described as it is shown in the drawings and as it has been embodied and successfully operated in the field. It is plain, however, that the construction could be varied by an expert mechanic and other prevalent devices used to perform the same work without departing from my invention.

Having now described my invention, what I claim is—

1. In combination in a self-binding harvester, a feed device, clearer-bars extending from the feeding device upwardly toward the grain side of the machine to form a receptacle for the accumulation of the grain, a gate pivoted at its discharge side, its receiving side caused to vibrate across the receptacle by a link pivoted to the gate and connected with a cam on the binder the link having a spring interposed between the power and the gate whereby the gate is positively opened to form the receptacle but is yieldingly closed to deflect the grain toward the binder.

2. In combination in a self-binding harvester, a feeding device, clearer-bars extending from the feeding device upwardly and toward the grain side of the machine to form a receptacle for the grain, a gate pivoted at its discharge side, the receiving side of its fingers vibrating in slots in the clearer-bars, substantially as and for the purpose specified.

3. In combination in a self-binding harvester a feeding device, a receptacle into which the grain is forced by the feeding device when the binder is in operation, a gate pivoted at its receiving side and when actuated, sweeping across the receptacle to force the grain toward the binder, one end of the discharge side of the gate having a bearing in the breastplate of the machine and sliding freely therethrough when the binder is adjusted for the central binding.

4. In combination in a self-binding harvester a feed device, connections therefrom to form a receptacle, a gate pivoted at its discharge side, its receiving side vibrating across the receptacle, the pivoted side being supported at one end by the harvester-frame which prevents its sliding when the binder is adjusted for central binding and sliding freely through the breastplate and the arm which controls the gate when the binder is slid for central binding, substantially as and for the purpose specified.

5. In combination in a self-binding harvester with an automatic binder located between the platform-apron and the main wheel, which receives the grain in a continuous stream from the harvester and separates from this stream portions which it forms into bundles and binds and discharges, a discharge-fork vibrating in a vertical plane from a position vertically behind the stream of grain to one that is beneath it, and then back again to its original position, whereby the grain carried into the binder and automatically formed into bundles and ejected from the binder, is discharged to the rear upon its butts.

6. In combination in a self-binding harvester, forwarding devices which carry the grain in a continuous stream from the platform to an automatic binder located between the platform and the main wheel of the machine, which binder receives and separates the grain into bundles which it binds and ejects upon a discharge-fork, a discharge-fork pivoted on the binder at the rear of the machine, a connection from this discharge-fork to a crank, also located on the binder, connecting mechanism between this crank and the machine whereby the discharge-fork begins its movement immediately upon motion being transmitted to the binder, and is disconnected when it has discharged the bundle to the rear.

7. In combination with a binder located between the main wheel and the platform, a discharge-fork pivoted thereto in a position when normally at rest that is inclined to the rear from the vertical, mechanism connecting with a moving part of the machine that starts the discharge-fork into action at the time the binder begins its movement of encircling and binding a bundle and that brings the discharge-fork to a position beneath the deck of the binder at the time the ejectors of the binder eject the bundle, and that continues the motion of the discharge-fork upwardly and rearwardly to discharge the bundle on its butts to the rear after the binding mechanism has come to rest.

8. In combination with an automatic binder that receives the stream of grain and apportions it into bundles of the same size, and binds and discharges these bundles, a discharge-fork pivoted upon the binder, a connecting-rod from this discharge-fork to a crank also located upon the binder, a gear mounted upon this crank and receiving motion from a companion gear loosely mounted upon the upright shaft of the binder, substantially as and for the purpose specified.

9. In combination with an automatic binder located between the platform-apron and the main wheel, a tripping mechanism positioned on the binder, through which motion is communicated from the stream of grain to a stop normally in the path of a pivoted spring-pressed dog, a ratchet in continuous motion in the path of the dog when relieved from its stop, continuously-acting connections between the clutched part and the discharge-fork and intermittently-acting connections to the bundle-forming and knot-tying and ejecting devices, whereby the motion of the discharge-fork is continuous until the device is unclutched and the motion of the bundle-forming and knot-tying and discharging devices is completed before the unclutching of the parts.

10. In combination in an automatic machine for receiving a stream of grain and apportioning it into bundles of the same size, binding and ejecting them upon a fork which throws them onto their butts in the rear of the machine, a continuously-driven element, a clutching device, a connection from this clutching device to the bundle-forming, knot-tying and ejecting devices, and another continuously-acting connection to the device that throws the bundle on its butts to the rear of the machine, the connection between the bundle-forming and knot-tying and ejecting mechanism being formed with a mutilated gear and delay-flange whereby these parts perform their operations and come to rest before the clutch mechanism is unclutched bringing the discharging mechanism to rest.

11. In combination in a self-binding harvester, of a binder positioned between the platform and the main wheel, a discharge-fork pivoted thereto on a horizontal pivot, a crank connected to the discharge-fork, a bevel-wheel on the shaft of the crank, and a companion wheel on the upright shaft of the binder in the path of a dog that is pivoted to the binder-shaft, a stop that normally holds this dog from the path of the constantly-rotating part, the stop being formed with an arm that is governed by a cam on the bevel-wheel of the crank-shaft, a mutilated gear connecting the upright shaft of the binder with the knotter-shaft whereby motion transmitted to the upright shaft will cause the discharge-fork to make its reciprocation and the other parts of the machine to perform their operations, the unclutching mechanism being controlled by the cam on the shaft of the crank that controls the discharge-fork.

12. In a bundle-discharging mechanism for binders, the combination substantially as hereinbefore described of a pivoted discharger oscillating in a plane lengthwise of the bundle, tines projecting from said discharger, the tine at the butt of the bundle being corrugated or roughened, and the tine nearer the head of the bundle having a vertical prong.

13. In a bundle-discharging mechanism for binders, the combination substantially as hereinbefore described, of the ejector-arms mounted on the knotter-shaft, a binder-deck, the discharge side of which curves outwardly and upwardly, practically concentric with the path of the end of the discharge-arms, a supplemental discharger oscillating in a plane lengthwise of the bundle and having tines which pass on both sides of the outwardly and upwardly extending deck to a point below said deck and beneath the discharge-line of the bundle.

14. In a bundle-discharging mechanism for binders, the combination substantially as hereinbefore described of the ejector-arms of the binder, a supplemental discharger, and mechanism for operating the discharger relative to the binder and ejector, so that the discharger will begin its oscillating movement concurrent with the movement of the ejector and continue this movement after the ejectors have come to rest.

15. In a bundle-discharging mechanism for binders, the combination substantially as hereinbefore described, of the ejector mechanism of the binder, a pivoted, oscillating, supplemental discharger, a mechanism for operating the discharger relative to the ejector, so that the bundle will be discharged from the binder by the ejectors onto the supplemental discharger, and thrown from the machine to the rear by the oscillation of the discharger after the ejectors have come to rest.

16. In a bundle-discharging mechanism for binders, the combination substantially as hereinbefore described of the binder-ejector, a supplemental discharger and mechanism for operating the discharger relative to the ejector, so that it will begin its movement practically in the same interval as the ejector, and fall beneath the line of the ejection of the bundle at the time the ejectors throw it from the machine, and continue its movement to discharge the bundle at an angle to the line of ejection of the bundle after the ejectors and the binding mechanism have come to rest.

17. In combination in a self-binding harvester in which the bundle is discharged at an angle to the location of the binder, a constantly-rotating packer-shaft, a train of gearing connecting this shaft with the knotter-shaft, in which train a clutch is located, a branch train-gear connecting this last-mentioned train between the constantly-rotating packer-shaft and the needle-shaft, with a pivoted oscillating ejector, one set of the gearing between the constantly-rotating packer and shaft and the knotter-shaft, consisting of a mutilated gear and delay-flange, substantially as and for the purpose described.

18. The combination, substantially as hereinbefore set forth, of the gear on the constantly-rotating packer-shaft and its bevel-wheel, a trip-dog pivoted to the upright shaft on which this bevel-wheel is mounted, a trip-stop pivoted on the machine, one arm of which falls within the path of the trip-dog, a spring holding the trip-stop within the path of the trip-dog, a trip-finger and its rock-shaft and the arms on said rock-shaft, one branch of which is in contact with the trip-stop and the other controlled by a cam, substantially as and for the purpose specified.

19. In combination substantially as hereinbefore set forth, with the trip-finger and its rock-shaft and the arm from said rock-shaft, one member of which is a cam that actuates the trip-stop and the other an arm that is acted upon by a cam-track on one of the train of gears that connects the constantly-rotating packer-shaft with the pivoted oscillating discharge-arm.

HENRY E. PRIDMORE.

Witnesses:
JOHN M. CULVER,
R. B. SWIFT.